United States Patent [19]

Phillips, II

[11] Patent Number: 5,074,497
[45] Date of Patent: Dec. 24, 1991

[54] DEICER FOR AIRCRAFT

[75] Inventor: Ronald W. Phillips, II, Sellersville, Pa.

[73] Assignee: The B. F. Goodrich Company, Akron, Ohio

[21] Appl. No.: 399,092

[22] Filed: Aug. 28, 1989

[51] Int. Cl.⁵ .............................................. B64D 15/16
[52] U.S. Cl. ............................ 244/134 D; 244/134 A
[58] Field of Search ............ 244/134 A, 134 R, 134 D

[56] References Cited

U.S. PATENT DOCUMENTS

| | | | |
|---|---|---|---|
| 2,440,240 | 4/1948 | Antonson | 244/134 A |
| 2,690,890 | 10/1954 | Weeks et al. | 244/134 D |
| 2,757,273 | 7/1956 | Taylor | 219/537 |
| 2,992,317 | 7/1961 | Hoffman | 244/134 R |
| 3,549,964 | 12/1970 | Levin et al. | 244/134 C |
| 4,690,353 | 9/1987 | Haslim et al. | 244/134 d |
| 4,875,644 | 10/1989 | Adams et al. | 244/134 R |
| 4,894,569 | 1/1990 | Lardiere, Jr. et al. | 310/10 |

FOREIGN PATENT DOCUMENTS

| | | | |
|---|---|---|---|
| 1272136 | 7/1968 | Fed. Rep. of Germany | 244/134 D |
| 505433 | 5/1939 | United Kingdom | 244/134 A |
| 2106966 | 4/1983 | United Kingdom | 244/134 D |

Primary Examiner—Michael J. Carone
Attorney, Agent, or Firm—Joseph Januszkiewicz

[57] ABSTRACT

A deicer pad for use on the airfoil of an aircraft wherein the pad has an elastomeric flexible covering with metallic spaced strips embedded therein in side by side relationship. An electromagnetic field pulse generator is mounted within the airfoil adjacent to the strips for imparting successive pulses to the strip for movement thereof to effect de-icing.

6 Claims, 3 Drawing Sheets

DEICER FOR AIRCRAFT

BACKGROUND OF THE INVENTION

This invention relates to a deicer and more particularly to an electro-dynamic de-icer for an aircraft.

Under certain atmospheric conditions ice forms and accumulates on the leading edges of wings, struts and propellers which in turn have an adverse effect on the air flow over these surfaces due to the change in the aerodynamic flow.

One of the main means for the removal of ice from these surfaces is to provide a de-icer device that has a plurality of tubular members that operate on being inflated to distend their flexible covering member to break up the ice formed. The tubular members are inflated and deflated in rapid sequence to provide for this action. Some objections to this type of de-icing is attributed to increase in the aerodynamic resistance because the distended tubes change the profile of the leading edge.

Another known method used to remove ice formations is to provide a de-icer device that relies on the intermittent or cyclic heating thereof to break up the ice. Objection is made to the greater power requirements of this method since the time necessary for heating the surface to be deiced is great due to the great differential in temperature between ambient temperature of the surrounding air and the temperature at which the ice melts. Since the heating zones only cover the leading edges, the water formed at these locations will flow to the unheated zones and freeze thereon to form artificial barriers to the smooth aerodynamic flow of air, which barriers are objectionable.

Another de-icing device and method uses an electromagnetic field to vibrate the outer sheet metal skin of an aircraft's leading edge. This method relies on the elastic deformation of the sheet metal and imparts a continual impact stress to the aircraft skin and accordingly is undesirable.

The present invention is directed to a new and improved de-icing means which eliminates many of these disadvantages while operating on a low power requirement yet ensuring a positive de-icing within seconds without adversely affecting the aerodynamic characteristics of the wings, strut or leading edge configuration of the aircraft. Such deicer of the present invention is more economical to manufacture and is particularly reliable in use under adverse conditions.

SUMMARY OF THE INVENTION

The present invention is directed to a deicer pad that is mounted on the leading edge of an airfoil such as a wing, strut or tail with an upper portion and a lower portion that extends rearwardly from the leading edge. Such deicer pad is made from an elastomeric flexible composition that has a plurality of spaced metallic strips in side by side relationship embedded therein. Electromagnetic field pulse generating means are mounted in the airfoil closely adjacent to the metallic strips which upon actuation provide for intermittent movement of the strips to break up ice on the deicer pad.

DETAILED DESCRIPTION

Figure 1:
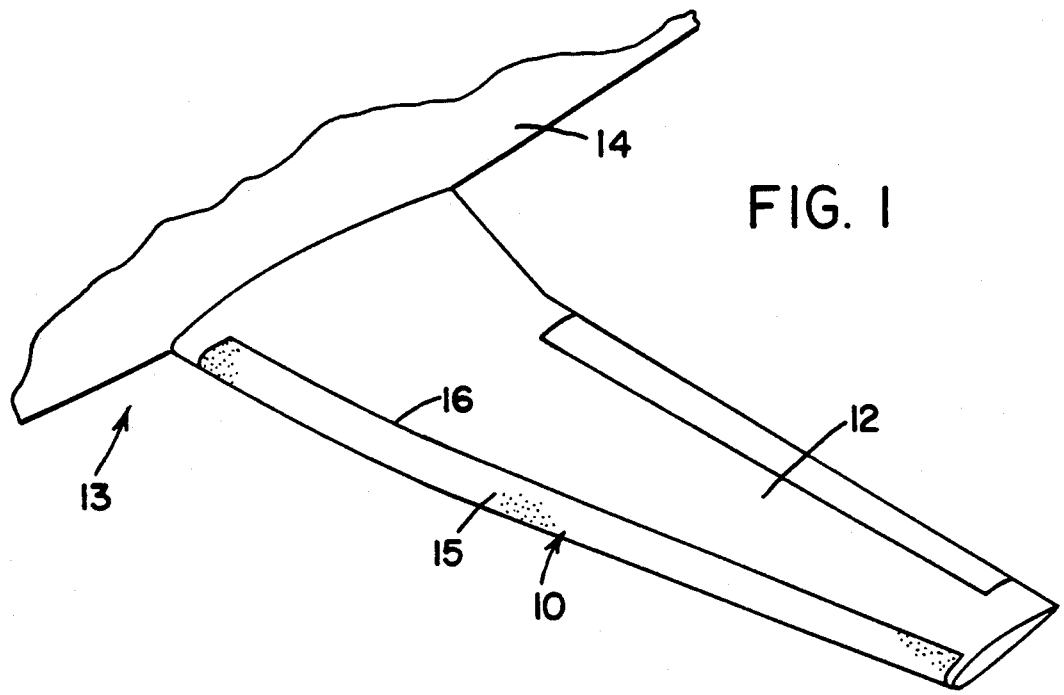
FIG. 1 is a perspective view of a portion of an airplane with a deicer mounted upon the leading edges of the wing.

Referring to the drawings wherein like reference numerals designate like or corresponding parts throughout the several views, there is shown in FIG. 1 a deicer or de-icer boot or pad 10 mounted on the leading edge of a wing 12 of an aircraft. The wing 12 is attached to the fuselage 14 of such aircraft 13. Although the invention is described with respect to a wing, it is equally application to other airfoil elements including struts, stabilizers and propellers.

Figure 2:
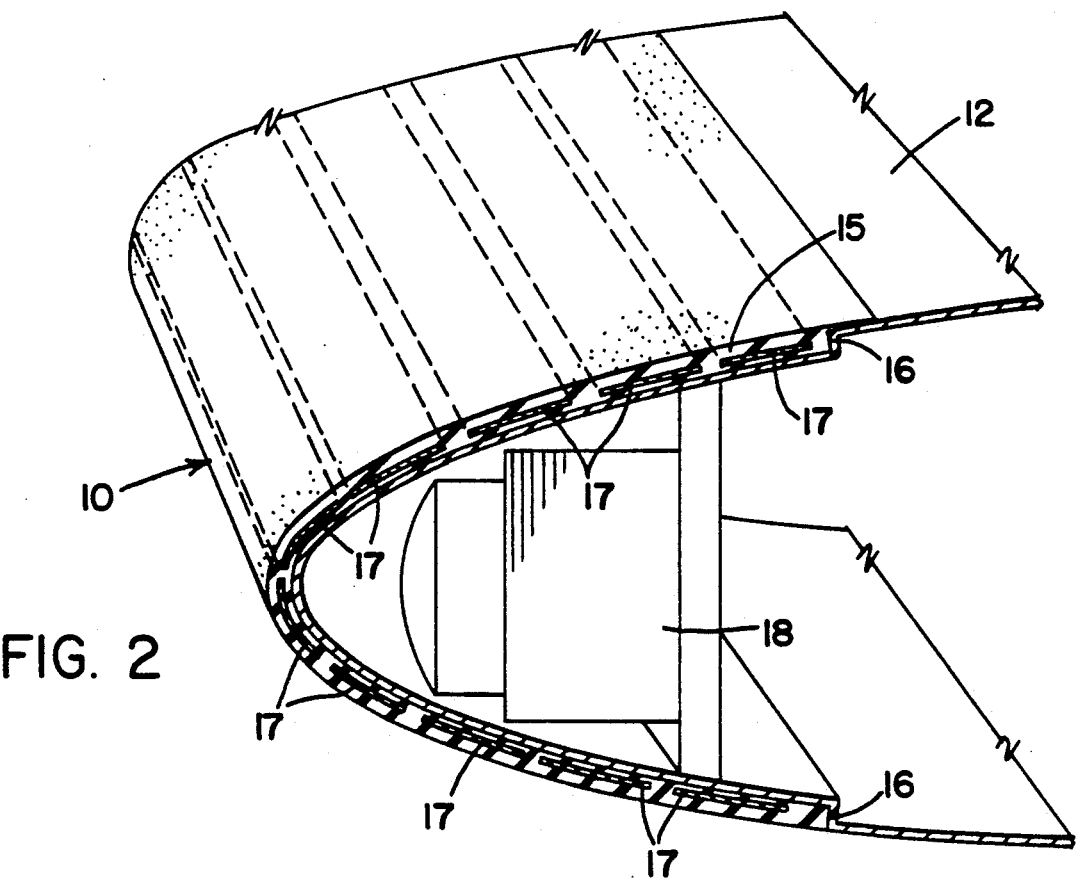
FIG. 2 is a perspective view partly in cross-section of a portion of the leading edge of the wing and the deicer.

The deicer pad as mounted extends rearwardly from the leading edge over a portion of the upper and lower surface portions of the wing 12. The deicer pad 10 is essentially a rectangular section or layer 15 of dielectric flexible composition material such as rubber or other resilient rubber-like or plastic material that can taper to the respective side edges of the wing to facilitate the installation on the wing 12 without interfering with the aerodynamic effects of the airfoil design or in lieu thereof, the rubber layer 15 or plies of material can have rectangular sides 16 as shown in FIG. 2 that fit snugly into recessed portions of the wing 12.

Such rubber layer 15, covering or layer of rubber-like material has a plurality of spaced strips 17 of metallic inserts bonded within the rubber layer to provide electrical insulation between such strips and completely surrounds each strip. A pulse generator or electrodynamic coil 18 is installed within the wing close to the leading edge of the wing 12 and the deicer pad 12. A suitable source of electric current is supplied to the electro-dynamic coil 18 to provide an intermittent current thereto to provide a pulsed electromagnetic field that causes an intermittent movement to the metallic strips 17 which are embedded in the resilient rubber layer or covering 15. The elastic and resilient property of the rubber layer 15 greatly facilitates the successive and intermittent movement of the metallic strips 17 to break up the ice formed on the leading edge of the wing and throw it off the surface of the deicer pad 10. As the ice breaks up, the airstream flowing over the leading edge of the wing blows the ice off. The means for generating pulses are old in the art and may comprise a suitable source of power 20 which is connected to a transformer 21 which in turn is connected to a rectifier 22 and thence to a suitable discharge device 23 which provides intermittent current to the electro dynamic coil 18. The electric pulses generated are of short duration and thus the increase and decrease in the current takes place in a rapid sequence at high speed. This type of action provides a much more economical and effective means for deicing and does not apply any impact to the rigid metal sheeting of the wing or aircraft skin. In addition the rubber skin provides erosion protection and increased flexibility to the deicer pad particularly over thin walled skin sheeting that would be stressed and require more power for deicing. Although the strips are shown in FIGS. 2 and 3 as extending in a direction generally parallel to the leading edge of the aircraft wing, the strips may be embedded in the elastomeric deicer boot in parallel planes, which planes are generally normal to the leading edge of the airfoil.

Figure 3:
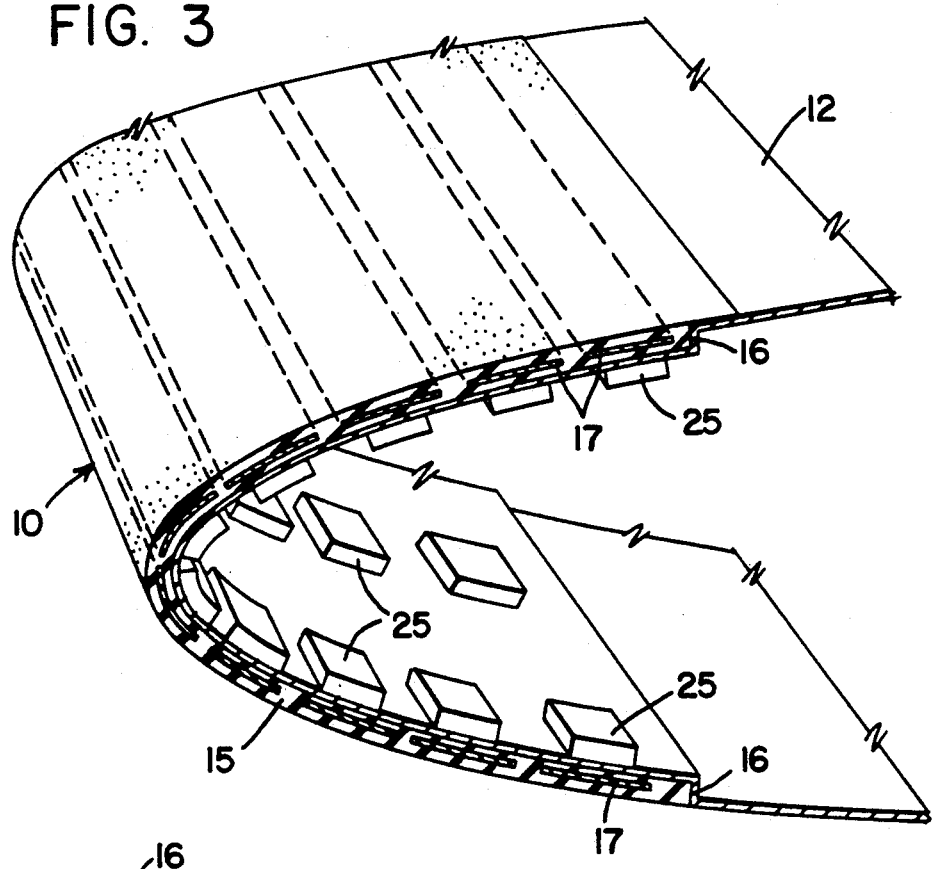
FIG. 3 is a perspective view partly in cross-section of a portion of the leading edge of an airplane wing and the deicer with a modified form of the actuating means for the deicer.
Figure 4:
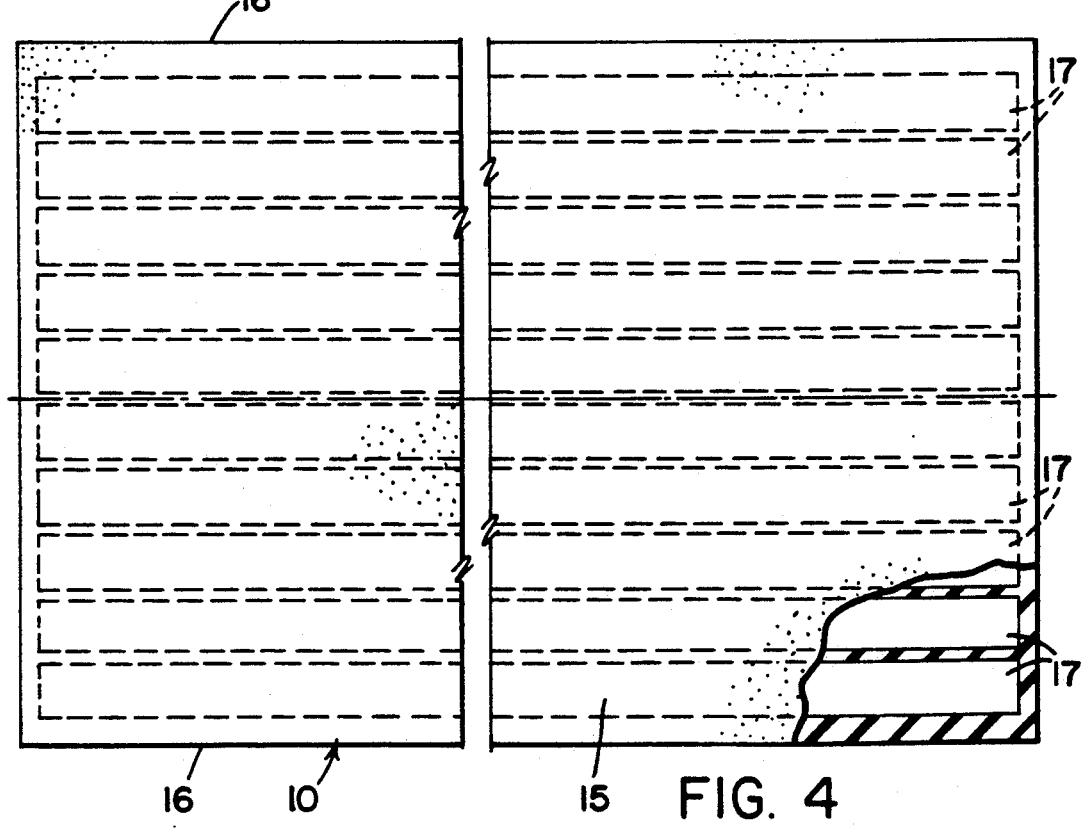
FIG. 4 is a diagrammatic illustration of pulse generating means for the deicer pad in accordance with the principles of the invention.
Figure 5:
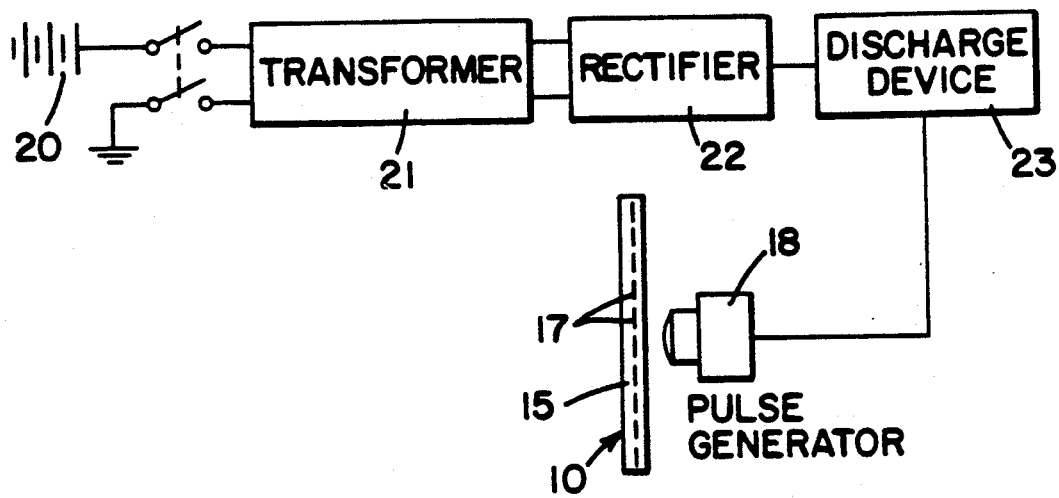
Figure 6:
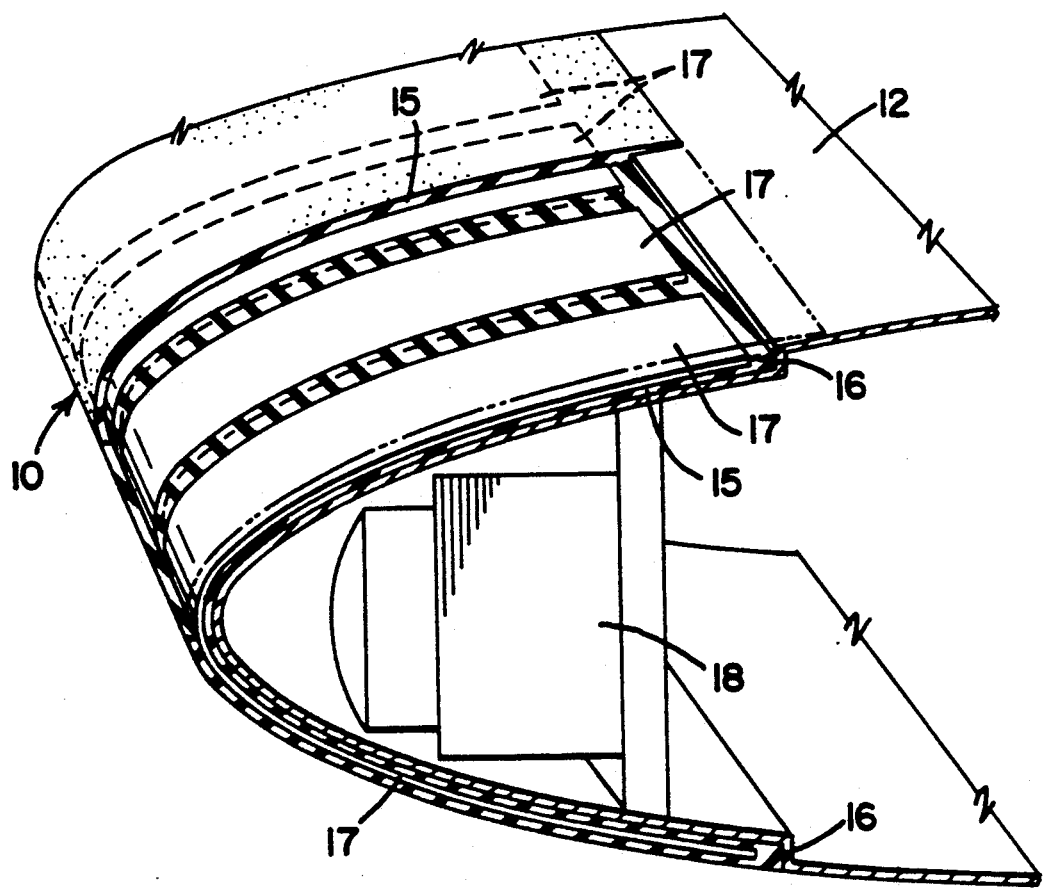

A modification of the electro-dynamic coil 18 for actuating the movement of the metallic strips 17 is shown in FIG. 3 wherein a plurality of wire coils 25 are used rather than a single coil to provide a closer located actuating electromagnetic pulsed field for the metallic strips. A suitable pulsed generating current is provided for the coils 25 as described in the first embodiment.

Various modifications are contemplated and may obviously be resorted to by those skilled in the art without departure from the spirit and scope of the invention, as hereinafter defined by the appended claims, as only preferred embodiments thereof have been disclosed.

I claim:

1. A deicer device for use on an airfoil of an aircraft wherein said airfoil has a leading edge, said deicer device consisting of a flexible sheet like protective covering, said covering made from a dielectric flexible composition material for mounting upon said airfoil and extending over said leading edge of aid airfoil, said covering having an outwardly disposed surface, a plurality of metallic strips extending in spaced side-by-side relation in said covering, each of aid strips surrounded by said flexible composition material, and means for generating electromagentic field pulses mounted in said airfoil to effect intermittent movement to said metallic strips for breaking up ice on said leading edge of said airfoil.

2. A deicer device as set forth in claim 1 wherein said strips extend in a direction generally parallel to the leading edge.

3. A deicer as set forth in claim 1 wherein said strips extend in planes that are generally normal to the leading edge of the airfoil.

4. A deicer device as set forth in claim 1 wherein aid pulse generating means is a single electro-dynamic coil, and said covering is a single layer containing said strip in a single curvilinear layer.

5. A deicer device as set forth in claim 1 wherein said pulse generating means comprises a plurality of electro-dynamic coils located adjacent said surface of said covering of said deicer device.

6. A deicer device for use on an airfoil that has a leading edge on an aircraft, said deicer device pad comprising a pad consisting of a dielectric flexible elastomeric covering for mounting over the leading edge of said airfoil, and a plurality of laterally spaced strips embedded in said elastomeric covering; the device further comprising electromagnetic pulse generating means mounted in said airfoil close to said covering, and power source means for imparting successive energy to said pulse generating means to effect a movement to said strips and said covering in response to a magnetic pulsed field of said pulse generating means to deice said covering.

* * * * *